United States Patent Office 3,786,129
Patented Jan. 15, 1974

3,786,129
METHOD OF MANUFACTURING FUSED MAGNESIA
Tadashi Kawabe, Ako, Japan, assignor to Tateho Kagaku-kogyo Kabushiki Kaisha, Ako, Japan
No Drawing. Filed May 4, 1971, Ser. No. 140,271
Int. Cl. C01f 5/02
U.S. Cl. 423—170       3 Claims

ABSTRACT OF THE DISCLOSURE

Fused magnesia of improved purity is manufactured from magnesia clinker by a method which comprises finely dividing magnesia clinker into a powder, treating the powder with water or an aqueous alkaline solution to form magnesium hydroxide, drying the treated powder, intermixing the dried powder with untreated magnesia clinker, and melting the mixture in an electric furnace.

---

This invention relates to a method of manufacturing fused magnesia, and especially to an improved method of manufacturing fused magnesia from magnesia clinkers and having improved purity and physical properties.

A magnesia clinker generally contains a small amount of boron and sulfate radicals. For example, a magnesia clinker manufactured by calcining at about 1600° C. magnesium hydroxide previously obtained by treating sea water, brine or bitters with milk of lime containing 0.2 to 1 percent of boron calculated as $B_2O_3$ and approximately 1.5 percent of sulfate radicals calculated as $SO_3$. Boron exists in a magnesia clinker in the form of $Mg_3(BO_3)_2$ and a suitable amount of boron existing therein has been deemed to be preferable because it serves a function of accelerating crystal grain growth of periclase at a relatively low temperature and also forms strong joints between the periclase grains during the calcination of magnesium hydroxide. However, it has been well known that the sulfate radicals, which exist in the form of $CaSO_4$, act to reduce the quality of the magnesia clinker.

Fused magnesia manufactured by melting a magnesia clinker in an electric arc furnace is used as refractory material, refractory electric insulators and the like after being powdered, classified and sintered, or as filler material for electric furnaces and the like in the form of powder. In these cases boron existing therein reduces softening temperature in load tests and also decreases electrical resistance at high temperature. During the melting operation in an arc furnace, carbon released from the electrodes reacts with $CaSO_4$ and produces a sulfide as shown by the following equations, thereby resulting in remarkably reduced quality.

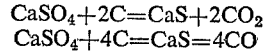

$$CaSO_4 + 2C = CaS + 2CO_2$$
$$CaSO_4 + 4C = CaS = 4CO$$

In prior methods a material amount of carbon peeled from off the carbon electrodes of the arc furnace has often mixed with the molten magnesia and colors it black or dark gray. This carbon ingredient is harmful when the product is used as an insulating material since it reduces insulation resistance, and also impairs the commercial value of the product even though it does not materially affect the product when it is used as a refractory material.

The invention involves an improvement of the method of treating a magnesia clinker with water or alkaline solution before the arc melting operation disclosed in Japanese Pat. No. 470,112. According to that method, it is possible to remarkably improve purity and physical properties of the fused magnesia and also to prevent intermixing of carbon in the product, but the method is too costly and uneconomical.

Accordingly, one object of this invention is to provide an improved method of manufacturing fused magnesia, which can prevent the electrode carbon from leaving the electrodes and intermixing in the molten product to color it and lower its electrical insulation properties and commercial value.

According to this invention, magnesia clinker is pulverized into fine powder and treated in water or aqueous solution of caustic alkali or ammonia. The treated powder is then added to a greater amount of untreated magnesia clinker to form a mixture and the mixture is melted in an electric arc furnace. According to this process it is possible to prevent carbon from remaining in the product and to improve the quality thereof. Furthermore, the cost for production is reduced because the amount of the treated powder added to untreated magnesia clinker is very small and constitutes only ten percent or less of the entire material placed in the furnace.

Generally, the semi-molten and nonmolten portions of the arc-melted magnesia contain a substantial amount of carbon released from the carbon electrodes of the furnace. According to prior methods, therefore, complicated carbon removing processes have been required for salvaging and re-using these portions together with the raw material. However, according to this invention, it is as possible, when using a material containing a substantial quantity of carbon, to obtain a fused product of low carbon content.

The magnesia clinker powder to be treated in water or alkaline solution in accordance with this invention is composed of particles having a dense structure and perhaps converted into hydroxide at their surfaces only during the treatment in water or alkaline solution and, therefore, there is no danger of explosion due to excessive production of hydroxide and consequent generation of a substantial amount of water vapor during the arc melting operation. Moreover, since this powder has a relatively large bulk density, it is not readily blown about by an ascending current of vapor produced in the furnace during the melting operation and begins to melt as it is dispersed throughout the coarse particles of the material. In the meantime, the hydroxide is decomposed to produce an appropriate amount of water vapor and the water vapor is distributed uniformly throughout the whole of the molten magnesia and causes the reaction which removes carbon and improves purity.

When finely divided magnesia clinker is treated in water, only the surfaces of the particles are converted into hydroxide in accordance with the following reaction.

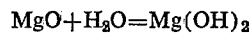

$$MgO + H_2O = Mg(OH)_2$$

When an appropriate amount of dried product of this treatment is intermixed enough with coarse particles of magnesia clinker which is not yet treated as discussed above and is melted in an arc melting furnace having carbon electrodes, most of the boron volatilizes and calcium sulfate reacts with carbon released from the electrodes to become calcium sulfide which in turn reacts with water produced by decomposition of magnesium hydroxide to become hydrogen sulfide. This hydrogen sulfide, which includes most of the sulfur-containing component of the raw material, volatilizes and does not remain in the product. These reactions are shown as follows:

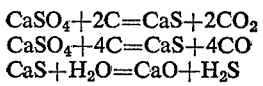

$$CaSO_4 + 2C = CaS + 2CO_2$$
$$CaSO_4 + 4C = CaS + 4CO$$
$$CaS + H_2O = CaO + H_2S$$

At the same time, the excessive carbon reacts with water resulting from the decomposition of magnesium hydroxide to become carbon monoxide which volatilizes as follows:

$$C + H_2O = CO + H_2$$

Thus, the content of impurities such as boron and sulfur is reduced and coloration of product due to carbon is prevented.

Now, the invention will be explained in detail in conjunction with some examples.

EXAMPLE 1

Magnesia clinker containing 97.50 percent MgO, 1.31 percent CaO, 0.61 percent $SiO_2$, 0.15 percent $Al_2O_3$, 0.14 percent $Fe_2O_3$, 0.14 percent $B_2O_3$ and 0.12 percent $SO_3$ (by weight respectively) was divided into powder having the particle size of 104 microns or less. One thousand kilograms of this powder was mixed with 5 kilograms of water and stirred for about two hours. After removing the water, it was washed again with water by sprinkling and then dried at 120° C. The resultant product included 91.80 percent by weight of magnesia and about 10 percent by weight of magnesia and about 10 percent by weight of magnesium hydroxide.

Fifty kilograms of such powder previously treated in water as above mentioned was intermixed with 2,000 kilograms of raw magnesia clinker having a particle size of about 5 millimeters in diameter and the same composition as set forth above, and then placed in an electric arc furnace having carbon electrodes and melted at 2800° C. or higher for about 12 hours. The resultant product was composed of a transparent glassy core portion and an opaque shell portion consisting of semi-molten block and nonmolten powder. Although the shell portion was colored black or dark gray by carbon released from the electrodes, the glassy core portion was separated out and divided into powder of appropriate particle size, thus obtaining the final product.

The composition of the final product was measured as 98.57 percent MgO, 0.38 percent CaO, 0.75 percent $SiO_2$, 0.10 percent $Al_2O_3$, 0.07 percent $Fe_2O_3$, 0.07 percent $B_2O_3$, 0.07 percent $B_2O_3$, and 0.02 percent $SO_3$ (by weight respectively) and it was found that all of the impurities were reduced by this process. The presence of carbon was almost impossible to detect using normal chemical analysis.

EXAMPLE 2

The nonmolten powder (black, containing 0.15 percent carbon) and the semi-molten block (black, containing 0.001 percent carbon) produced in the process of Example 1 were divided into coarse particles of about 5 millimeters in diameter. One thousand kilograms of these particles were intermixed with 80 kilograms of the previously treated powder in Example 1 and placed in an electric arc furnace and melted for about 12 hours. The resultant fused glassy core had almost the same appearance and composition as the glassy core of the product of Example 1.

What is claimed is:

1. A method of manufacturing fused magnesia comprising the steps of pulverizing sulfate-containing magnesia clinker to form a fine powder, treating the surface of said powder in a liquid selected from the group consisting of water, an aqueous solution of caustic alkali or an aqueous solution of ammonia to form magnesium hydroxide, drying said treated powder, adding said dried powder to a greater amount of coarse particles of untreated magnesia clinker to form a mixture and then melting said mixture in a carbon electrode-containing electric arc furnace.

2. A method of manufacturing fused magnesia according to claim 1 wherein the particle size of said powder is not greater than 104 microns and the size of said coarse particles of untreated magnesia clinker is about 5 millimeters.

3. A method of manufacturing fused magnesia according to claim 1 wherein the amount of said dried powder is not greater than 10 percent of the total material placed in said furnace.

References Cited

UNITED STATES PATENTS

| | | | |
|---|---|---|---|
| 2,640,759 | 6/1953 | Hughey | 23—201 |
| 3,429,664 | 2/1969 | Campbell et al. | 23—201 |
| 3,464,790 | 9/1969 | Schrader et al. | 23—201 |
| 3,471,259 | 10/1969 | Sese | 23—201 |
| 3,525,588 | 8/1970 | Hwang | 23—201 |

FOREIGN PATENTS

| | | | |
|---|---|---|---|
| 1,095,871 | 12/1967 | Great Britain | 23—201 |
| 470,112 | 4/1966 | Japan. | |

EDWARD J. MEROS, Primary Examiner

U.S. Cl. X.R.

423—635, 636